US009405484B2

(12) United States Patent
Winokur

(10) Patent No.: US 9,405,484 B2
(45) Date of Patent: Aug. 2, 2016

(54) SYSTEM OF MANAGING REMOTE RESOURCES

(71) Applicant: Infinidat LTD., Herzliya (IL)

(72) Inventor: Alex Winokur, Ramat Gan (IL)

(73) Assignee: INFINIDAT LTD., Herzliya (IL)

( * ) Notice: Subject to any disclaimer, the term of this patent is extended or adjusted under 35 U.S.C. 154(b) by 293 days.

(21) Appl. No.: 14/215,166

(22) Filed: Mar. 17, 2014

(65) Prior Publication Data

US 2014/0289487 A1    Sep. 25, 2014

Related U.S. Application Data

(63) Continuation of application No. 13/081,963, filed on Apr. 7, 2011, now abandoned.

(51) Int. Cl.
*G06F 3/06* (2006.01)
*G06F 11/20* (2006.01)

(52) U.S. Cl.
CPC .............. *G06F 3/065* (2013.01); *G06F 3/067* (2013.01); *G06F 3/0619* (2013.01); *G06F 11/2071* (2013.01)

(58) Field of Classification Search
CPC ........ G06F 3/0619; G06F 3/065; G06F 3/067; G06F 11/2071
See application file for complete search history.

(56) References Cited

U.S. PATENT DOCUMENTS

| 7,143,235 B1 | 11/2006 | Watanabe et al. |
| 7,275,103 B1 * | 9/2007 | Thrasher ................. H04L 45/22 709/223 |
| 7,584,340 B1 | 9/2009 | Colgrove |
| 7,769,722 B1 | 8/2010 | Bergant et al. |
| 7,899,933 B1 * | 3/2011 | Black .................... G06F 3/0607 709/223 |
| 8,185,663 B2 * | 5/2012 | Cochran ............. G06F 11/2071 709/214 |
| 8,284,198 B1 | 10/2012 | Hackworth et al. |
| 8,539,172 B1 * | 9/2013 | Winokur ............... G06F 3/0605 711/154 |
| 8,645,659 B1 * | 2/2014 | Winokur ............... G06F 3/0605 711/170 |
| 2004/0068636 A1 * | 4/2004 | Jacobson ............. G06F 3/0605 711/203 |
| 2004/0260965 A1 | 12/2004 | Kelman |
| 2006/0282485 A1 | 12/2006 | Aggarwal et al. |
| 2007/0011137 A1 | 1/2007 | Kodama |

(Continued)

FOREIGN PATENT DOCUMENTS

WO    WO 2010085228    7/2010

*Primary Examiner* — Michael C Lai
(74) *Attorney, Agent, or Firm* — Reches Patents

(57) ABSTRACT

A system of managing remote resources that includes a local storage associated with a local storage manager constituting a local storage system. A remote storage associated with a remote storage manager constituting a remote storage system. The local storage system is associated with the remote storage system by means of a first link. The local storage system is configured to send through the first link I/O remote commands complying with the SCSI protocol, for execution in the remote storage system. The system includes a second link associating the local storage system and the remote storage system. The local storage manager being responsive to remote storage management commands and being configured to send through the second link corresponding cross-storage-remote management commands that comply with the SCSI protocol, for execution in the remote storage.

22 Claims, 6 Drawing Sheets

(56) References Cited

U.S. PATENT DOCUMENTS

| | | |
|---|---|---|
| 2007/0043705 A1 | 2/2007 | Kaushik et al. |
| 2007/0174569 A1 | 7/2007 | Schnapp et al. |
| 2008/0016121 A1* | 1/2008 | Revah ............... G06F 17/30138 |
| 2008/0281875 A1 | 11/2008 | Wayda et al. |
| 2009/0089462 A1 | 4/2009 | Strutt |
| 2011/0078398 A1* | 3/2011 | Jess ..................... G06F 3/061 711/162 |
| 2011/0082997 A1 | 4/2011 | Yochai et al. |
| 2012/0259961 A1* | 10/2012 | Winokur ............ G06F 3/0619 709/223 |

\* cited by examiner

SYSTEM OF MANAGING REMOTE RESOURCES

CROSS-REFERENCES TO RELATED APPLICATIONS

This application is a continuation of U.S. patent application Ser. No. 13/081,963 filing date Apr. 7, 2011, incorporated herein by reference in its entirety.

FIELD OF THE INVENTION

This invention relates to remote management operations.

BACKGROUND OF THE INVENTION

Management operations of storage in remote locations, often referred to as remote management operations, are typically executed, at least partially, by human storage administrators and are quite involved.

Storage Management commands (operations) are commands that do not directly concern the I/O operations that are addressed to the storage system (such as write data to or read data from a storage). The storage management commands may concern modifications in the internal structure of data in the storage system (e.g. volumes, mirrors, snapshots), or in the distribution of data over the physical components of the storage system, and the like. Remote Storage management commands are management commands that are addressed to remote storage systems.

Thus, remote management operation may include by way of example one or more of the following management operations:
1. Communication management: includes part or all of the following: defining the communication paths between the storage systems to participate in the operation. Communication management includes identifying port pairs on local and remote storage systems over which remote operations and data will flow.
2. Volume management includes: part or all of the following: Definition of a remote mirroring pair, i.e., the relationship between primary volumes (residing in local storage) and secondary volumes (residing in remote storage), definition of consistency groups and definition of the replication type. Consistency group, as is well known, refers to gathering of a few distinct volumes for the purposes of applying certain management commands to all of them as atomic commands. Thus, for instance, a mirroring operation in respect of the consistency group will create a replica of all the volumes in the group as an atomic command, and not of each of the specified volumes in a row. Also: snapshots (either local or remote) of all volumes in the group are created as an atomic operation. Replication type, as is well known, includes synchronous and a-synchronous operation. In the former, the replication action is terminated upon receipt of acknowledgement from the remote site, whereas in the latter, operation does not require acknowledgement for every mirroring transaction. Synchronous operation is more reliable (as every successful operation is acknowledged), but this is at the penalty of slower response time, naturally affecting performance, all as known per se. Note that Volume management is a very involved task.
3. Snapshot management includes part or all of the following: Creation or deletion of snapshots in remote storage. The snapshots in remote storage are typically of volume of the local storage.
4. Mirror management includes part or all of the following: creation or termination of the mirror in the remote storage of volumes in the local storage.

What complicates the remote management procedures even further is the fact that in accordance with the prior art, remote storage is typically managed by a different (human) storage administrator than the one who manages the primary (local) storage.

An exemplary remote I/O operation is remote mirroring. Thus, for instance, in I/O remote mirroring operation, data that resides in volumes of local storage, is replicated and copied in accordance with a known protocol (e.g. synchronous, or asynchronous) into volume(s) that reside in remote storage. The remote mirroring affords restoration of lost or damaged data in the local storage, e.g. by accessing and retrieving the "mirrored data" from the remote storage. There are known techniques for implementing remote minors, such as in "*Information Storage and Management: Storing, Managing, and Protecting Digital Information*" Chapter 14 by EMC (hereinafter the "Information Storage").

Note that in the context of remote mirroring, various known per se mechanisms have been devised to make sure that volumes will not be overwritten, which significantly complicates the definition of remote mirroring.

For a better understanding of the foregoing, attention is drawn to FIG. 1, illustrating a block diagram of a generalized system architecture for carrying out remote mirroring, according to the prior art. As shown, in FIG. 1 Host 10 accesses local storage 11 for executing I/O operations 12, such as reading/writing volumes or snapshots that reside in local storage. Local storage is depicted for simplicity as a single unit, although in real life this is typically not the case. As is further known in the art, management operations, such as create or delete resources (e.g. volumes/snapshots) in the local storage, require involvement of computerized storage manager module 13, possibly also with significant involvement of human storage administrator 14 through interface 15. For instance in order to create local volume the human administrator 14 in charge of the local storage should be approached. In response, the human administrator activates the computerized storage manager 13 (through interface 15) for creating a volume at local storage 11. Remote operations (such as remote mirroring) not only require a sequence of operations that are executed at the local storage 11, but also operations performed at the remote storage 16 and this requires involvement of computerized remote storage manager module 17 and possibly also of remote human storage administrator 18 (utilizing interface 19). Note that in many cases, the remote storage may be of different characteristics (and/or commercially available from a different vendor) than the local storage, and therefore the local and the remote storage managers are not identical, further hindering the coordination required to implement the remote management operation. Moreover, in many cases, the local and remote storage administrators are different entities, thereby further complicating the remote management preparatory operations and the actual remote management implementation. Thus, for example, in order to apply remote mirroring, a volume (say V1) is created in the local storage 11 in the manner specified above. Now, the remote human administrator 18 (typically a different entity than the local human administrator 14) is approached and requested to create a remote volume V1' and to attach it to V1. The remote administrator will activate the computerized remote storage manager 17 (through interface 18) for creating remote volume V1' and associating V1' to V1.

Once establishing the adequate infrastructure for carrying out remote mirroring (in response to the specified preparatory operations) known per se procedures can be invoked for implementing remote mirroring (e.g. through link 100), e.g. in accordance with the teaching of the specified Information Storage publication.

As is well known, Storage pools is a mechanism used by storage administrators or managers to monitor and control storage allocation to hosts, e.g. in the case of volumes with snapshots or of thin volumes. A storage manager allocates a storage pool in accordance with the size of the storage quota to be allocated for a particular user, which accesses the system via a host or via a group of hosts. The storage pool forms part of the storage system. All volumes for this user are allocated then by the storage manager (e.g. local storage manager 13) from this storage pool. This is useful for instance in the case of snapshots, because while one can anticipate the amount of snapshots to be created by the user, it is difficult to anticipate the rate of change of data in the source after any snapshot to is created, and accordingly it is difficult to anticipate the amount of additional storage space that will be needed as new data is created as part of the snapshot mechanism. Hence, the pools provide a flexible way to manage the space allocated to a certain user. When the space in the pool is depleted, no more data can be allocated for volumes associated with the pool and no new volumes can be created which use space associated with this pool. At this point the storage manager/administrator may free some space by deleting some volumes or snapshots, thus increasing the pool size, or abort the new data allocation.

The storage manager (possibly under control of the storage administrator) is also in charge of imposing security rules, for instance authorizing or denying access of the host to given volumes/snapshots (e.g. residing in storage pools).

There is thus a need in the art to simplify remote operation management.

There is still another need in the art to reduce the amount of coordination between remote storage manager(s) and administrators.

There is still another need in the art to allow delegation of some of the remote management tasks from storage manager/administrator to the host manager.

SUMMARY OF THE INVENTION

According to an embodiment of the invention there may be provided a system for managing remote resources comprising a remote storage system and a local storage system linked to the remote storage system, wherein the local storage system may be linked to hosts, wherein the system may be configured to: create a local pool in the local storage system for accommodating local volumes permitted to be accessed by a certain host; generate a first handle associated with the local pool for granting access to the local pool by the certain host; create a remote pool in the remote storage system for accommodating remote volumes and associating the remote pool with the local pool; receive by the local storage system from the certain host, a remote management command utilizing the first handle, wherein the remote management command includes a request for managing of a resource in the remote pool associated with the local pool; transmit, by the local storage system to the remote storage system, a cross storage management command that corresponds to the remote management command, for execution at the remote pool.

The remote management command may be for managing a remote volume in the remote pool, wherein the remote volume may be associated with a local volume in the local pool.

The remote management command may be a remote mirror command, wherein the cross storage management command may be for creating in the remote pool that may be associated with the local pool a remote volume designated to be a mirror of a local volume indicated in the remote management command; and wherein the system may be further configured to: associate the local volume with the remote volume; and initiate a mirroring process.

The remote management command may be a create remote snapshot command, wherein the system may be further configured, in response to the remote management command, to identify in the remote pool, a remote volume that corresponds to a local volume in the local pool; wherein the remote pool may be associated with the local pool that corresponds to the first handle; and wherein the cross storage management command may be for creating a snapshot of the remote volume in the remote pool.

The remote management command may comply with an I/O (Input/Output) protocol, while not directly concerns I/O operations.

The system may be further configured to generate a second handle for enabling access to the remote pool by the local storage system, wherein the cross storage management command utilizes the second handle and complies with the I/O (Input/Output) protocol, while not directly concerns I/O operations.

The system may be further configured to create a local pool volume associated with the local pool and wherein the first handle may be indicative of the local pool volume, thereby enabling association of the first handle with the local pool.

The remote management command may be selected from a group of commands consisting of creating a remote volume, creating a remote snapshot of a remote volume, deleting a remote volume, deleting a remote snapshot of a remote volume and pairing a local volume and a remote volume.

The remote management command may be embedded in a SCSI (Small Computer System Interface) command.

The system I/O protocol may be a SCSI (Small Computer System Interface) protocol.

According to an embodiment of the invention there may be provided a method for managing remote resources in a remote storage system linked to a local storage system, wherein the local storage system may be linked to hosts, the method may include: creating a local pool in the local storage system for accommodating local volumes permitted to be accessed by a certain host; generating a first handle associated with the local pool for granting access to the local pool by the certain host; creating a remote pool in the remote storage system for accommodating remote volumes and associating the remote pool with the local pool; receiving by the local storage system from the certain host, a remote management command utilizing the first handle, wherein the remote management command includes a request for managing of a resource in the remote pool associated with the local pool; and transmitting, by the local storage system to the remote storage system, a cross storage management command that corresponds to the remote management command, for execution at the remote pool.

The remote management command may be for managing a remote volume in the remote pool, wherein the remote volume may be associated with a local volume in the local pool.

The remote management command may be a create remote minor command, wherein the cross storage management command may be for creating in the remote pool that may be associated with the local pool a remote volume designated to be a mirror of a local volume indicated in the remote management command; and wherein the method may include associating the local volume with the remote volume; and initiating a mirroring process.

The remote management command may be a create remote snapshot command, wherein the method further comprising in response to the remote management command, identifying in the remote pool, a remote volume that corresponds to a local volume in the local pool; wherein the remote pool may be associated with the local pool that corresponds to the first handle; and wherein the cross storage management command may be for creating a snapshot of the remote volume in the remote pool.

The remote management command may comply with an I/O (Input/Output) protocol, while not directly concerns I/O operations.

The method may include generating a second handle for enabling access to the remote pool by the local storage system, wherein the cross storage management command utilizes the second handle and complies with the I/O (Input/Output) protocol, while not directly concern I/O operations.

The method may include creating a local pool volume associated with the local pool and wherein the first handle in indicative of the local pool volume, thereby enabling association of the first handle with the local pool.

The remote management command may be selected from a group of commands consisting of: creating a remote volume, creating a remote snapshot of a remote volume, deleting a remote volume, deleting a remote snapshot of a remote volume and pairing a local volume and a remote volume.

The remote management command may be embedded in a SCSI (Small Computer System Interface) command.

The I/O protocol may be a SCSI (Small Computer System Interface) protocol.

The first handle may be a ITL (Initiator Target Logical unit number) handle that includes an initiator port for attaching to the host, a target port for attaching to the local pool, and a LUN (Logical Unit Number) uniquely identifying the first handle.

The second handle may be an ITL (Initiator Target Logical unit number) handle that includes an initiator port for attaching to the local storage system, a target port for attaching to the remote pool, and a LUN (Logical Unit Number) uniquely identifying the second handle.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
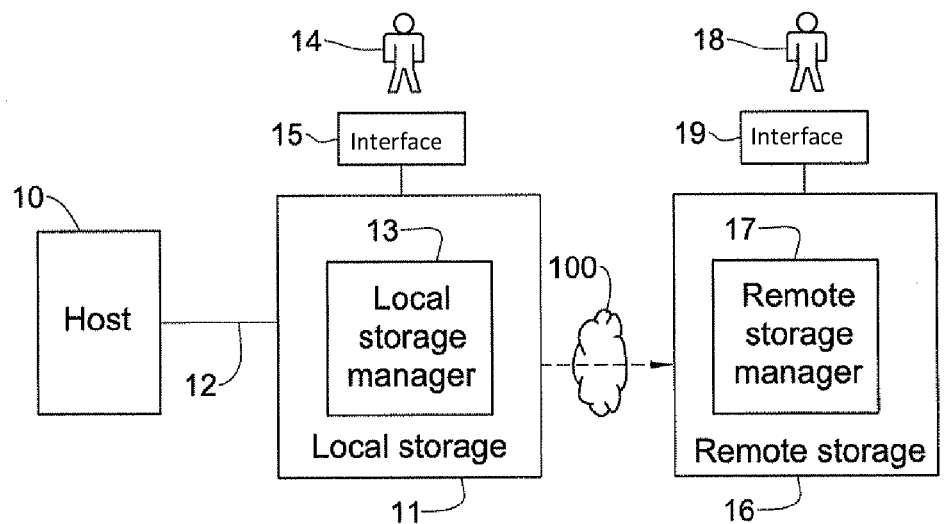
FIG. 1 is a block diagram of a generalized system architecture for carrying out remote mirroring, according to the prior art.

Note that in the drawings and descriptions, identical reference numerals indicate those components or stages that are common to different examples.

Unless specifically stated otherwise, as apparent from the following discussions, it is appreciated that throughout the specification discussions utilizing terms such as providing, sending, executing or the like, include action and/or processes of a computer that manipulate and/or transform data into other data, said data represented as physical quantities, e.g. such as electronic quantities, and/or said data representing the physical objects.

Note that unless stated otherwise, in addition to or instead of what may be construed from the description herein, all technical and scientific terms used herein may have the same meaning as understood by one of ordinary skill in the art.

The operations of the host manager, local storage manager, or remote storage manager, may be performed by a computer specially constructed for the desired purposes or by a general purpose computer specially configured for the desired purpose by a computer program stored in a computer readable storage medium.

Note that the terms command and operation are occasionally used interchangeably. Note also that the term command is not necessarily confined to a single computer instruction but, depending upon the particular application, may include a plurality of instructions.

Figure 2A:
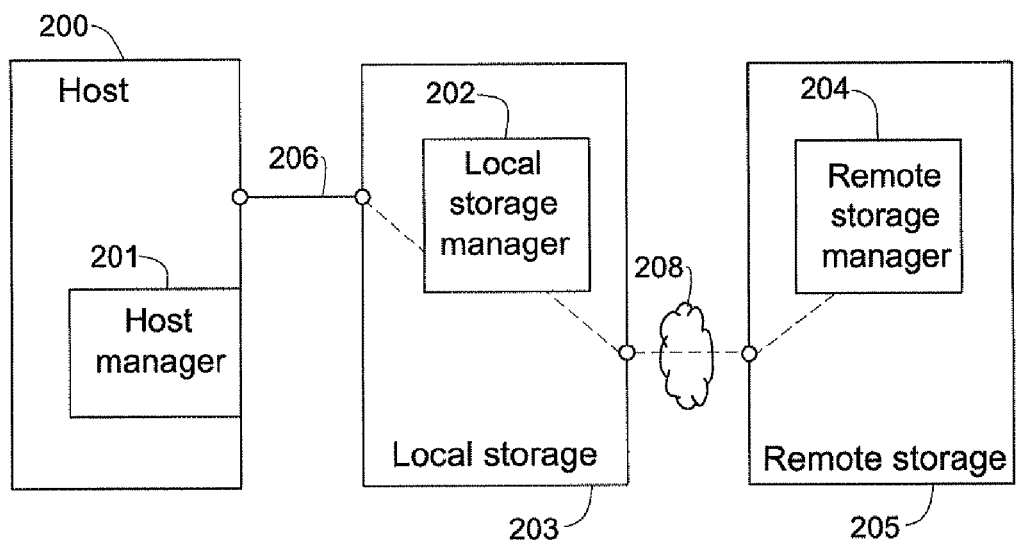
FIG. 2A is a block diagram of a generalized system architecture, in accordance with certain embodiments of the invention.

Turning now to FIG. 2A, it illustrates a block diagram of a generalized system architecture, in accordance with certain embodiments of the invention.

As shown, the host manager 201 (associated with the host 200) invokes a remote management command, and transmits it to a local storage manager 202 (associated with local storage 203) through a link 206. Note that the link between the host and the local storage (say 12) is used in the prior art architecture of FIG. 1 to convey I/O commands (such as read/write data to and from a storage resource). In accordance with certain embodiments as illustrated in FIG. 2A, a link between host manager (associated with the host) and the local storage will be used to convey management commands including remote management commands.

Note that in accordance with certain embodiments a local system includes the specified local storage manager and the local storage.

In case the command is designated to local storage, the local storage manager executes the command vis-à-vis the local storage 203. In case the command is designated to the remote storage, the local storage manager 202 transmits a cross storage management command to remote storage manager 204 through link 208, where the latter executes, in turn, the remote command commands vis-à-vis the remote storage 205.

Note that in accordance with certain embodiments, a remote system includes the specified remote storage manager and the remote storage.

Note that the link between the local storage system and remote storage system (say 100) is used in the prior art architecture of FIG. 1 to convey I/O commands (such as read/write data to and from a storage resource). In accordance with certain embodiments as illustrated in FIG. 2A, a link between the local storage and the remote storage systems will be used to convey remote management commands designated to be executed on the remote storage.

Note that in accordance with certain embodiments, triggering remote management commands from the host and utilizing links (e.g. 206 and 208) for conveying the management commands (instead of I/O non management commands as in the prior art) obviates the need to involve the local and remote human storage administrators.

In accordance with certain embodiments, after having executed the management command, the pertinent I/O commands (e.g. write snapshot data or mirroring data for storing in remote storage 205 may be transmitted through the same or similar links (as is the case with prior art architecture).

In accordance with certain embodiments for a given local storage 203, there may be associated two or more remote storages 205.

Figure 2B:
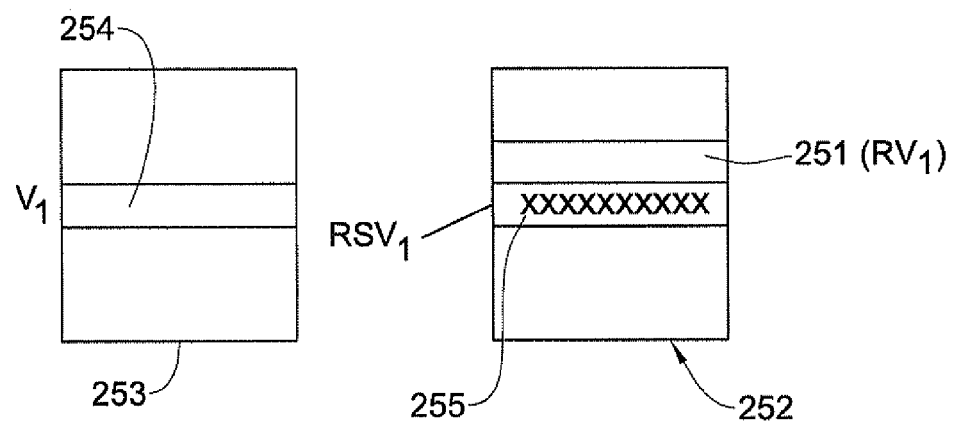
FIG. 2B illustrates schematically, remote and local storages, in accordance with certain embodiments of the invention.

Turning now to FIG. 2B, it illustrates schematically remote and local storages, in accordance with certain embodiments of the invention.

Thus, in accordance with certain embodiments, a remote secondary volume (e.g. $RV_1$ 251) resides in a remote pool e.g. 252 (forming part of remote storage 205). A local pool e.g. 253 (forming part of local storage 203) accommodates the primary volume e.g. $V_1$ 254. As will be exemplified in greater detail below, the local and remote pools are associated with each other and within the associated pools, selected local and remote volume(s) are associated with each other (e.g. volume $V_1$ 254 is associated with remote volume $RV_1$ 251), for the purpose of executing remote command, such as remote mirroring. Note that a volume in a remote pool can be associated to a volume in a local pool only if the pools are associated.

Insofar as another remote command is concerned, e.g. remote snapshot, note that remote snapshot (e.g. 255) of a local volume (e.g. V1) resides in a remote pool (e.g. 252) only if the latter is associated with local pool 253 (that accommodates the local snapshotted volume $V_1$).

Figure 2C:
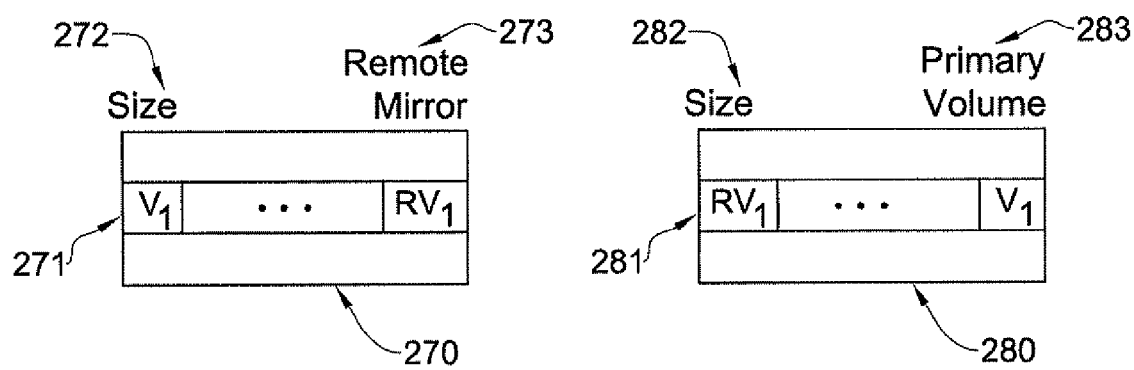
FIG. 2C illustrates schematically, local and remote volume management tables, in accordance with certain embodiments of the invention.

The association between the volumes may be reflected in corresponding local and remote volume management tables and may be utilized e.g. for implementing the specified remote mirroring. This is illustrated for example in FIG. 2C showing schematic local volume management table 270 where the data that pertains to local volume e.g. $V_1$ is stored in record 271 and among the various fields characterizing the volume (e.g. size 272) there is further indicated remote mirror field 273 designated $RV_1$. Similarly the remote volume management table 280 includes record 281 for remote volume $RV_1$ which includes characterizing fields (e.g. size 282) and primary volume field 283 designating the counterpart local volume $V_1$. The specified databases can be utilized by the remote mirroring utility to place the minors of local volume $V_1$ in remote volume $RV_1$ (in remote pool 252) utilizing to this end link 208.

Specific volume management table portions 270 and 280 are illustrated by way to of example only and any known per se data structures may be used.

In accordance with certain embodiments, in terms of privileges, this may include:
The host that originates the remote management command, must have access to the local pool and volume (within the pool) in respect of which a remote operation is performed (e.g. remote mirror or remote snapshot)

For remote minor operation, the remote volume (e.g. 251) which accommodates the remote minor (of the local volume e.g. 254) must reside in a remote pool (e.g. 252) that is associated with a local pool e.g. 253 and the remote volume (e.g. 251) must be associated with the local volume 251).

For remote snapshot operation, the remote snapshot (e.g. 255) of the local volume e.g. 254 must reside in a remote pool (e.g. 252) that is associated with a local pool e.g. 253.

Figure 3:
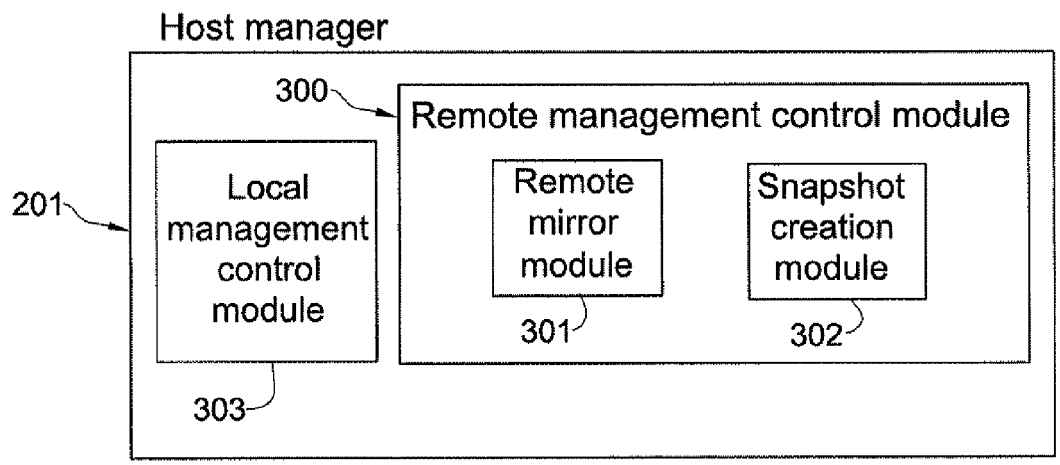
FIG. 3 is a block diagram of host manager modules, in accordance with certain embodiments of the invention.

Turning now to FIG. 3, it illustrates a block diagram of host manager modules, in accordance with certain embodiments of the invention. Thus, as shown, host manager 201 of FIG. 2, includes remote management control module 300 which includes remote mirroring module 301 in charge of commencing remote mirroring management commands. Also shown is remote snapshot creation module 302 in charge of commencing remote snapshot creation management commands. Note that by the specific example of FIG. 3 only two remote management operations are exemplified. The invention is of course not bound by the specified remote mirroring and remote create snapshot operations. The host manager further includes local resource management control module 303 for issuing local resource management operations at the local storage (pool).

Note that the invention is not bound by the specific architecture of FIG. 3.

Figure 4:
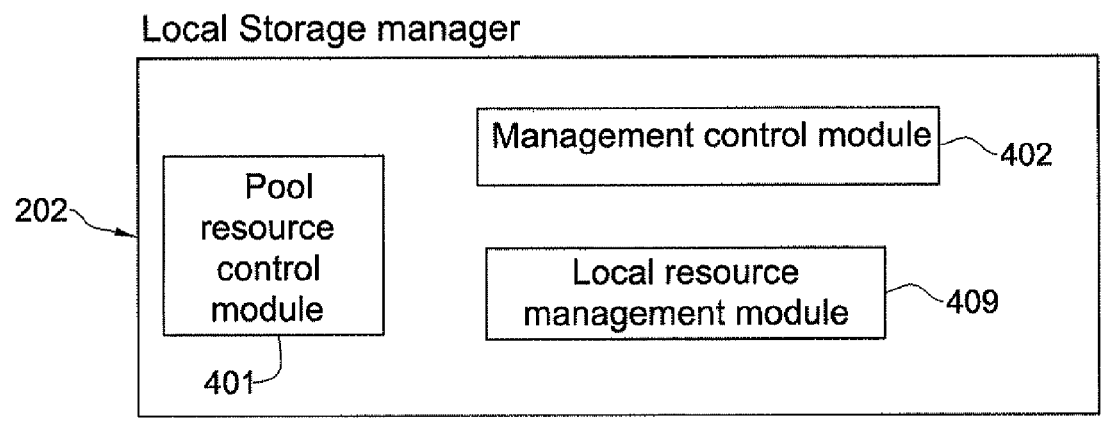
FIG. 4 is a block diagram of storage manager modules, in accordance with certain embodiments of the invention.
Figure 4:
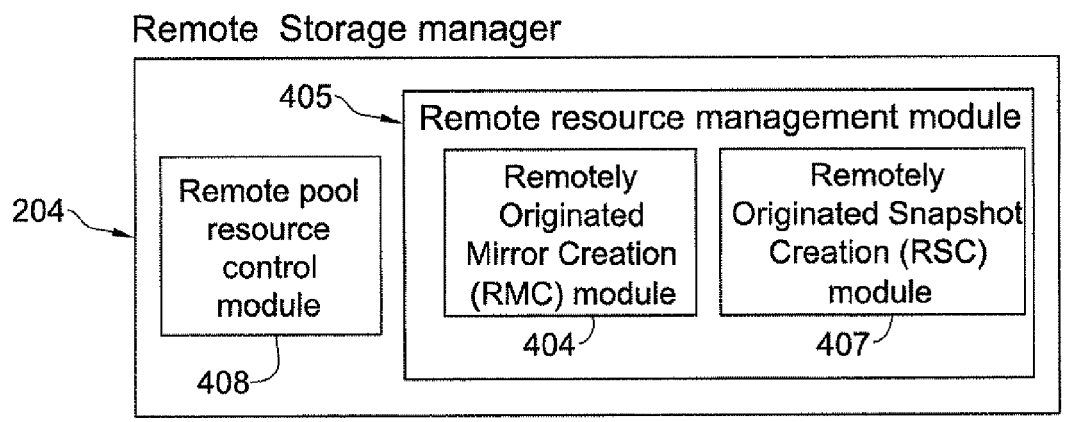

Turning now to FIG. 4, it illustrates a block diagram of storage manager modules, in accordance with certain embodiments of the invention. Thus, as shown, local storage manager 202 of FIG. 2, includes pool resource control module 401 (whose operation will be explained in greater detail below) and management control module 402 which is in charge of commencing cross-storage remote management operations such as cross-storage mirroring management commands (in response to a triggering a command from the host manager module 301). The management control module 402 is configured to communicate indirectly (as will be exemplified below) with remote mirroring control (RMC) module 404 forming part of remote management module 405) of remote storage manager 204 (all as will be exemplified in greater detail below) which will execute the specified remote mirror management command.

The management control module 402 is further in charge of commencing a cross-storage snapshot creation management command (in response to triggering a command from the host manager module 301). The management control module 402 is configured to communicate indirectly with remote snapshot creation (RSC) module 407 (of remote storage management module 405) of remote storage manager 204 (all as will be exemplified in greater detail below), for executing remote snapshot creation management command.

The remote storage manager further includes remote pool resource control module 408 whose operation will be explained in greater detail below.

Note also that the local storage manager 202 includes local resource management module 409 for implementing operations on local storage (pool), all as will be explained in greater detail below.

Note that by the specific example of FIG. 4 only two remote management operations (snapshot creation and mirroring) are exemplified. The invention is of course not bound by the specified remote mirroring and remote create snapshot operations.

Note that the invention is not bound by the specific architecture of FIG. 4.

Figure 5:
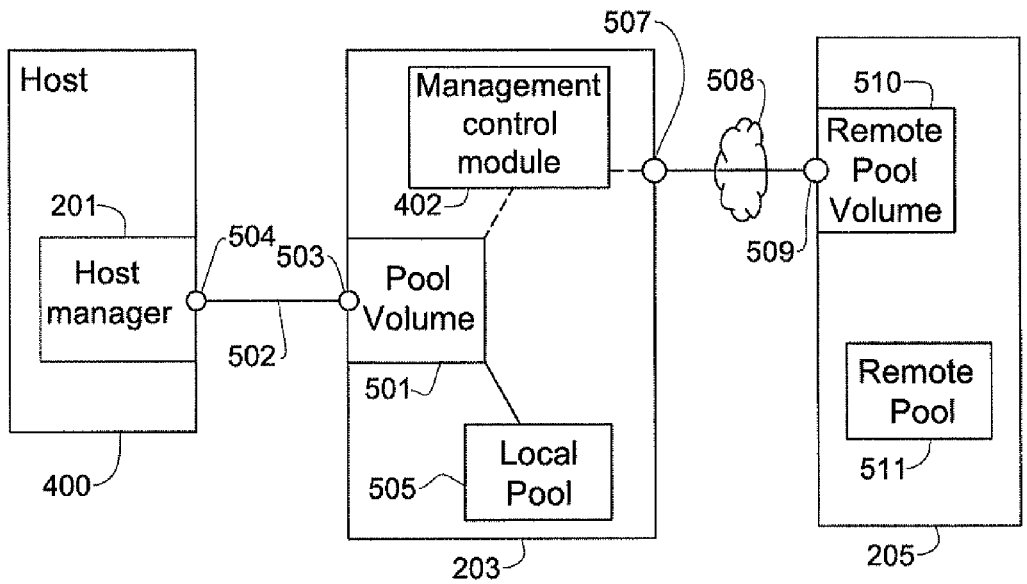
FIG. 5 is a schematic illustration of a host and extended pool, in accordance with certain embodiments of the invention.

Turning now to FIG. 5, it shows a schematic illustration of a host and extended storage pool, in accordance with certain embodiments of the invention.

As shown, a so called local pool volume 501 is created (e.g. by means of pool resource controller 401 of the local storage manager 202—see FIG. 4). The pool volume complies with the general structure of known per se volumes and in accordance with certain embodiments has an initial size 0.

The local storage manager 202 (e.g. by means of pool resource controller 401) further creates a handle 502 (e.g. in accordance with the initiator-Target-LUN [ITL] paradigm) allocating a unique LUN as part of the specified handle (handle being an example of a link). Note that whilst the handle is depicted for clarity as a physical connection between the host and volume, those versed in the art will readily appreciate that the LUN is indicative of a logical connection between a host and the pool volume. The pool resource control module 401 further attaches the handle to the pool volume 501 through target port 503 and the host manager 201 attaches the handle to the host 10 through initiator port 504, e.g. in compliance with the known per se volume ITL paradigm, see U.S. application Ser. No. 12/957,613, filed 1 Dec. 2010, whose contents are incorporated herein by reference.

The pool volume 501 will be associated with a created pool 505 that forms part of the local storage (e.g. 203 of FIG. 2). Note that each pool is defined by a name, the size of physical storage associated with it, and logical volumes associated with it.

The specified architecture of local extended pool (including the pool and the associated pool volume) will be utilized by the host for triggering a management command for managing local resources (such as create/delete local volumes/snapshots) and for triggering remote management operations (such as create remote snapshot/create remote mirror), in a manner that will be described in more detail below.

As further shown in FIG. 5, a remote extended pool that includes remote pool volume 510 and remote pool 511 (the latter forms part of remote storage 205) and their association is created by remote pool resource control module 408 of remote storage manager 204.

A link between the local storage and the remote storage is required in to order to convey the remote management commands (originated from the host) to the remote side for execution at the remote pool. More specifically, a link (e.g. a handle complying with the ITL paradigm) is created between the management control module 402 (of local storage manager 202—see FIG. 4) and the remote pool volume 510. To this end, the pool resource control module 408 of the local storage manager 202 (see FIG. 4) defines an initiator port 507 and attaches it to the management control module 402. The remote pool resource control module 408 (of remote storage manager 204), in turn, defines a target port 509 and attaches it to the remote pool volume 510. It further allocates a LUN # (508) and sends the data to the local pool resource control module for associating the LUN 508 to initiator port 507, thereby creating a handle facilitating communication (in compliance with the ITL paradigm) between the management control module 402 and remote pool volume 510, all as will be explained in greater detail below.

Note that the link (e.g. ITL based link, 502-504) between the host and the local storage as well as between the local storage and remote storage (e.g. 507 to 509), serve in accordance with certain embodiments for conveying remote management commands (such as create remote snapshot or create remote mirror), whereas according to the prior art such links served for communicating I/O commands (e.g. read data from /write data to storage resources such as volumes and/or snapshots). Note also that the ITL paradigm is an example only and is by no means binding.

It should be noted that the operation of the specified pool resource control module 401 associated with the local storage manager 202 may occasionally require the involvement of a human resource administrator at the local site.

It should be also noted that the operation of the remote pool resource control module 408 associated with the remote storage manager 202 may occasionally require the involvement of human resource administrator at the remote site.

Note also that association between a primary storage pool e.g. 505 and a secondary storage pool e.g. 511 is performed by associating the primary pool volume 501 with a secondary pool volume 510. This is in useful for example if multiple primary pools on a single primary storage are to be associated with multiple remote pools on a secondary storage.

Figure 6:
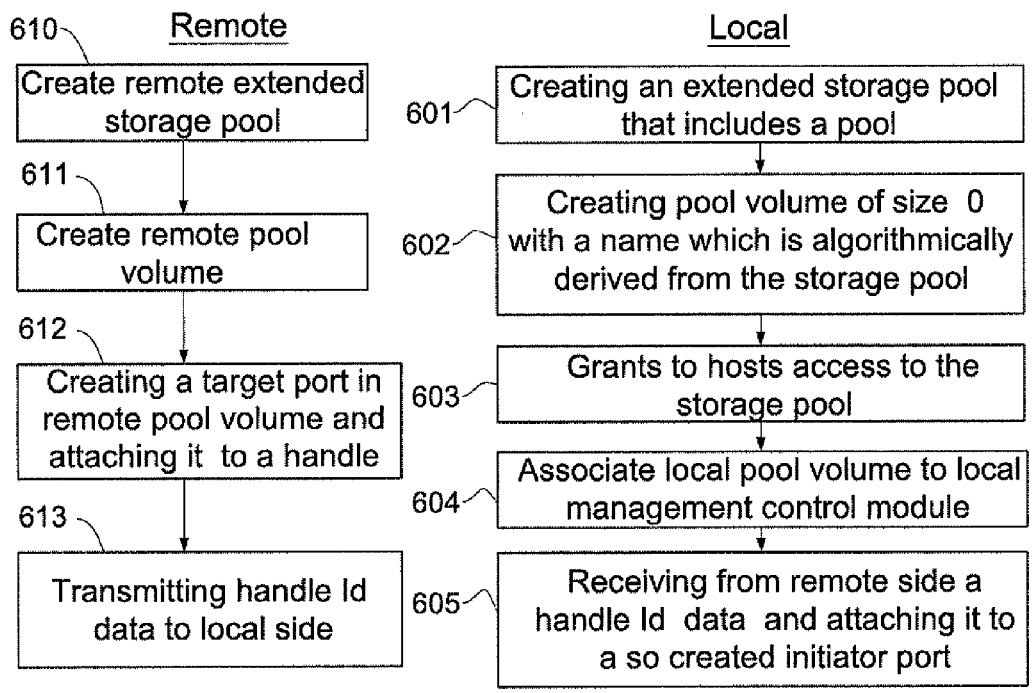
FIG. 6 is a flow chart illustrating a sequence of operations for generating an extended pool by a storage manager, in accordance with certain embodiments of the invention.

Turning now to FIG. 6 it shows a flow chart illustrating a sequence of operations for generating a local and remote extended pools by the respective storage manager (as outlined e.g. in FIG. 4), in accordance with certain embodiments of the invention.

Thus, in step 601, the pool resource control module 401 of the storage manager module 202 creates an extended storage pool that includes a pool of specific size and specific pool name (e.g. 505 of FIG. 5).

In step 602, the pool resource control module 401 creates a volume (designated "pool volume" forming part of the extended pool) of size 0 (e.g. 501) with a name which is algorithmically derived from the storage pool. For instance, if VOL_TEST_POOL_NAME is the pool name then the pool volume name (algorithmically derived therefrom) may be VOL_TEST_POOL_NAME_POOLVOLUME. Note that the name relationship between the pool and the pool volume names is not necessarily algorithmically derived and obviously not limited to the example above which was provided for illustrative purposes only.

In step 603, the pool resource control module 401 grants to hosts access to the local storage pool 505. This is accomplished by associating the pool volume 501 with the appropriate handle 502, in a similar fashion to known per se creating and attaching a volume to a host.

In step 604, the resource control module 401 associates local pool volume 501 to management control modules 402 (of local storage manager 202) and in step 605 receives a handle data (e.g. LUN #508) from the remote side and attaches it to so created initiator port (e.g. 507) of management control module 402 to thereby establish an ITL based communication between the local management control module 402 and the remote pool volume 510. This handle will serve for conveying remote management commands in an I/O protocol format (e.g. SCSI)) to remote pool volume 510), all as will be explained in greater detail below. To this end it associates an initiator port (e.g. 507) to the management control modules 402.

FIG. 6 further elaborates the operational stages performed by the remote resource pool control module 408 of remote storage manager 204. Thus, at stage 610, a remote extended storage pool that includes a pool 511 is created. At stage 611 a remote pool volume of size 0 with a name that is algorithmically derived from the storage pool is created (510).

In stage 612 a target port (e.g. 509) is created at pool volume 510 and a handle (including 508) is generated. The handle data is sent (613) for attaching it to the management control module at the local side (as described above), thereby establishing an ITL based link between the management control module 402 and the remote pool volume 510.

In accordance with certain embodiments the local and remote pool volume names may also be related.

It should be noted that the utilization of the pool volumes in the manner specified prescribes a certain privilege regime. Thus, for example the utilization of the pool volume will only allow the host to manage and access a local pool that is associated to this given host. By the same token, in the remote side, only a remote pool that is associated with the remote pool volume is accessible.

Note that the invention is not bound by the specified sequence of operations of FIG. 6.

Figure 7:
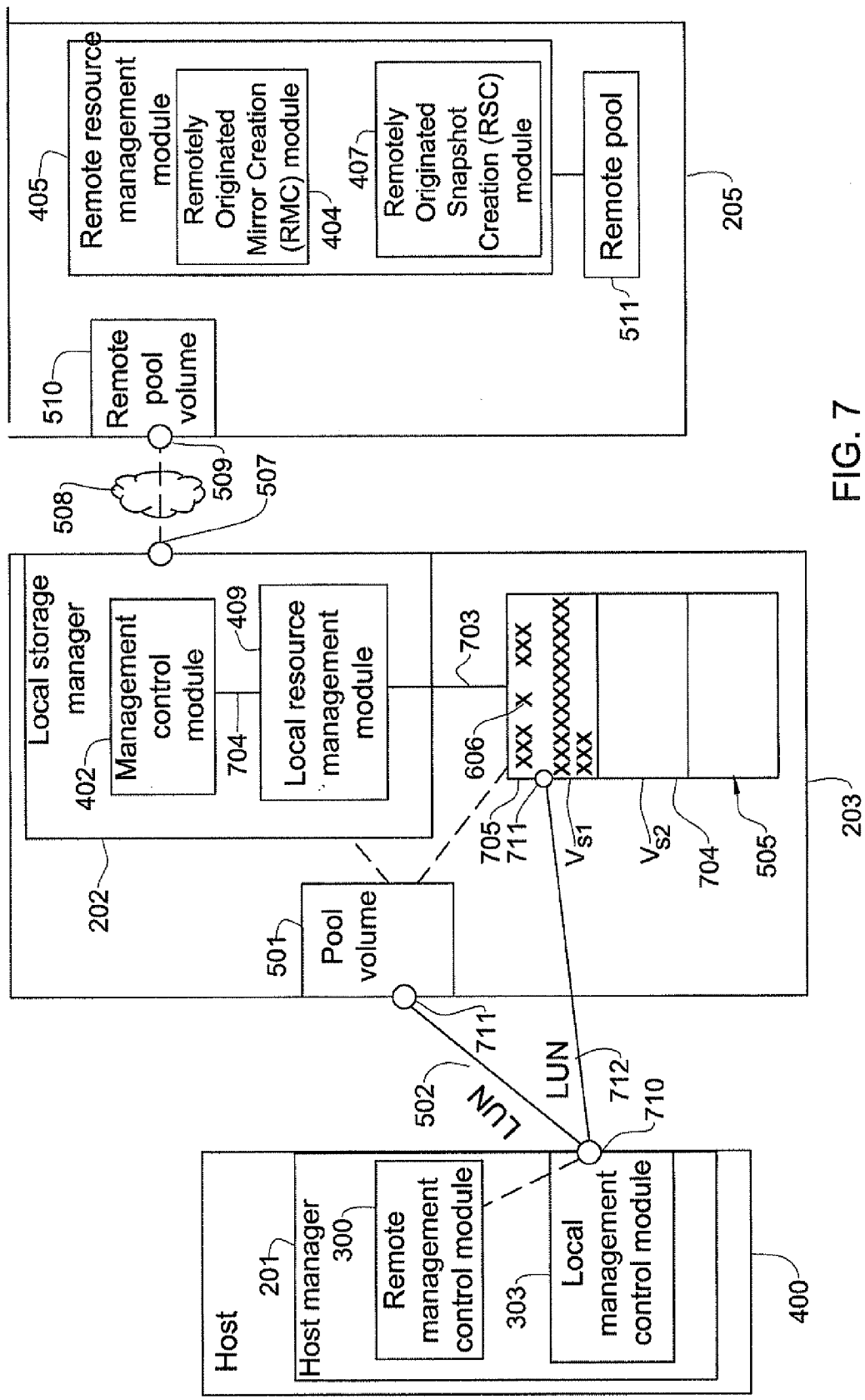
FIG. 7 illustrates, schematically, local and remote operations, in accordance with certain embodiments of the invention.

Turning now to FIG. 7, it illustrates schematically remote management operations, in accordance with certain embodiments of the invention. For clarity of explanation, the description focuses at first on implementing local operations at the local pool (e.g. pool 505) before moving on to remote operation.

Thus, the host manager (associated with host 400) issues through its local resource management module (303), a "create volume $V_{S2}$ in a pool" command 701 (e.g. imbedded in a SCSI command as will be discussed in greater detail below) and sends the command to the appropriate pool volume 501. To this end, the host utilizes the dedicated handle 502 attaching the host 400 to the pool volume 501. The storage manager (e.g. through its local resource manager 409—see also FIG. 4) receives and parses 702 the command and executes, in a known per se manner, creation 703 of volume $V_{S2}$ 704 in pool 505. For instance, the parsing (at the local storage manager end, e.g. module 409) may include transforming the SCSI command into a CLI (Command Line Interface) format for implementing the management command, such as create volume. As is well known, the SCSI command appears in a so called CDB (Command Descriptor Block) format which can be modified to incorporate a CLI format.

Reverting now to FIG. 7, note that pool 505 already accommodates volume $V_{S1}$ 705 storing data 706 indicative, for example, of snapshots of a primary volume (not shown in FIG. 7) of host 400. The local resource management module 409 of the local storage manager 202 executes this command by creating the requested volume of the specified name and size in the specified pool, allocating a free LUN number to it (712) in compliance with the ITL paradigm. In accordance with certain embodiments, an ITL is created which is based on this LUN and an initiator port 502 and target port 711 which are the same as the ones allocated for the pool volume 501. This can be illustrated, for example, in FIG. 7, where the initiator port 710 is the same one for both LUN numbers (represented graphically as LUNs 502 and 712). By the same token, target port 711 is the same for both LUN numbers. As may be recalled, the LUN numbers, whilst presented for simplicity as having physical connections between the host and the respective volumes, are in fact (as is well known) logical connections and therefore the target port 711, although presented graphically as two distinct "locations", may be common to both LUNs 502 and 712.

The description with reference to FIG. 7 illustrates an exemplary management command i.e. create volume. Other management commands can be implemented, e.g. deleting a volume from a given pool, create local snapshot, etc. mutatis mutandis.

Note also that in accordance with certain embodiments, in addition to "pool" and "pool volume", also other resources such as "volume" and "volume snapshot" may have algorithmically derivative names. Thus, for instance, a volume called say VOL_TEST is created. A pool that is associated to this volume may have the name VOL_TEST_POOL_NAME (where the volume VOL_TEST is algorithmically derived from the pool name). All the snapshots in this volume may have names that are algorithmically derived from the volume name, for example: YYYY.MM.HH.MM.SS-VOL_TEST_SNAPs (where VOL_TEST_SNAPs signifies a snapshot associated with volume VOL_TEST and YYYY.MM.HH.MM.SS signifies the snapshot's creation time). Note that the name relationship between the pool, pool volume and other resources' names is not necessarily algorithmically derived and obviously not limited to the example above which is provided for illustrative purposes only.

Note that the description with reference to FIG. 7 illustrates one form of resource, i.e. a standard volume. The invention is however applicable to other resources of external virtual memory, such as snapshots or thin volumes.

Having described local operations, the description below with reference to FIG. 7 will now focus on the remote management operations. Thus, consider for example, a remote operation such as create remote snapshot. This command is originated by snapshot creation module 302 (shown in FIG. 3) of remote management control module 300 in host manager 201. This SCSI command (SCSI being an example of I/O protocol) is transmitted through the LUN 502 to local pool volume 501. In contrast to the processing of local management command in the local resource management module 409 (as discussed above), the latter module 409 receives the host originated remote management command, analyses it and concludes that it is a remote management command rather than local management command and consequently sends it through link 7000 to management control module 402. In accordance with certain embodiments, the management control module 402 optionally generates and transmits a cross storage (SCSI) command (indicative of create remote snapshot) to remote pool volume 510 utilizing the ITL handle (initiator port 507, LUN 508 and target port 509).

Note that the cross-storage command may be the original command sent from the host manager (using of course a different initiator and target port, i.e. 507 and 509 instead of 710 and 711) or a newly generated command (syntactically wise) but semantically representative of the same host originated command (e.g. create remote snapshot).

Note that the specified ITL handle (507 to 509) is typically implemented over standard wide area network infrastructure, since as specified, the remote side is typically geographically remote from the local site.

The pool volume 510 at the remote side transmits (720) the so received SCSI command to remote storage manager (not shown in FIG. 7) and more specifically to remote resource management module 405 thereof. The remotely originated snapshot control module 407 of the remote resource management 405 parses the command and executes, in a known per se manner, (i.e. creation of remote snapshot in remote pool 511). Note that the parsing of the command (at the remote storage manager end, e.g. module 407) may include transforming the SCSI command into a CLI (Command Line Interface) format for implementing the management command, such as create snapshot. As is well known, the SCSI command appears in a so called CDB (Command Descriptor Block) format which can be modified to incorporate a CLI format. Note that in accordance with certain embodiments, the actual snapshotted data (e.g. the SCSI I/O command of write snapshot data) utilizes also ITL links between the host and the local storage as well as between the local storage and the remote storage, in a known per se manner (as is the case with the prior art system depicted in FIG. 1).

Note that the generation of the remote snapshot is illustrated for example with reference to FIG. 2B, discussed above.

An operation of remote mirroring management command is performed in a similar manner mutatis mutandis, using for instance remote minor control module 404 in remote resource management module 405 of remote storage manager 15.

Thus, for example, and as has been explained with reference to FIGS. 2B and 2C, local and remote volumes (say $V_1$ and $RV_1$, respectively) are created utilizing the local storage manager and remote storage managers, respectively. Having created the volumes, a SCSI remote mirroring management command (e.g. create volume pair $V_1$, $RV_1$) is originated by the host manager. The SCSI command is transmitted to the local storage 203 (through LUN 502) and processed (including parsing) at the local resource management module 409. The latter will indicate in local volume management table 270 (at the remote mirror field 273 thereof) that the minor volume of local volume $V_1$ is $RV_1$. Next the command will be sent to the management control module 402 which will generate a cross-storage "create volume pair" SCSI command (having the same or different syntax) and will send it through handle (LUN 508) to remote volume 510 which sends it to remotely originated mirror creation module 404 (of remote resource management module 405). Module 404 parses and processes the command and consequently updates the primary volume field 283 of remote table 280 by designating that $V_1$ is the primary volume for which $RV_1$ serves as a mirroring module. Now, after having created the volumes and utilizing the local and remote management commands originated from the host for updating the respective tables (thereby associating the volumes $V_1$ and $RV_1$), known per se mirroring techniques may be utilized (also employing in accordance with certain embodiments ITL based handles linking between the host and the local storage as well as between the local storage and remote storage) for implementing I/O commands (e.g. SCSI) for actually writing at the remote volume $RV_1$ the mirrored data.

Note that whilst the description with reference to FIGS. 2 and 7 exemplified one to one correspondence between associated modules ($V_1$ and $RV_1$), this is not necessarily the case and accordingly, in accordance with certain embodiments, a few minor volumes may be associated to one primary volume.

Note that the description with reference to FIG. 7 illustrated only one pool 505 associated with the pool volume 501. This however is not obligatory, and there may be more than one pool associated with the specified pool volume. In this case the SCSI command should indicate the name of the target pool.

Note that whilst the description with reference to FIG. 7 and various other embodiments illustrate usage of an SCSI command, this is a non limiting example of I/O protocol for communicating a storage.

Figure 8:
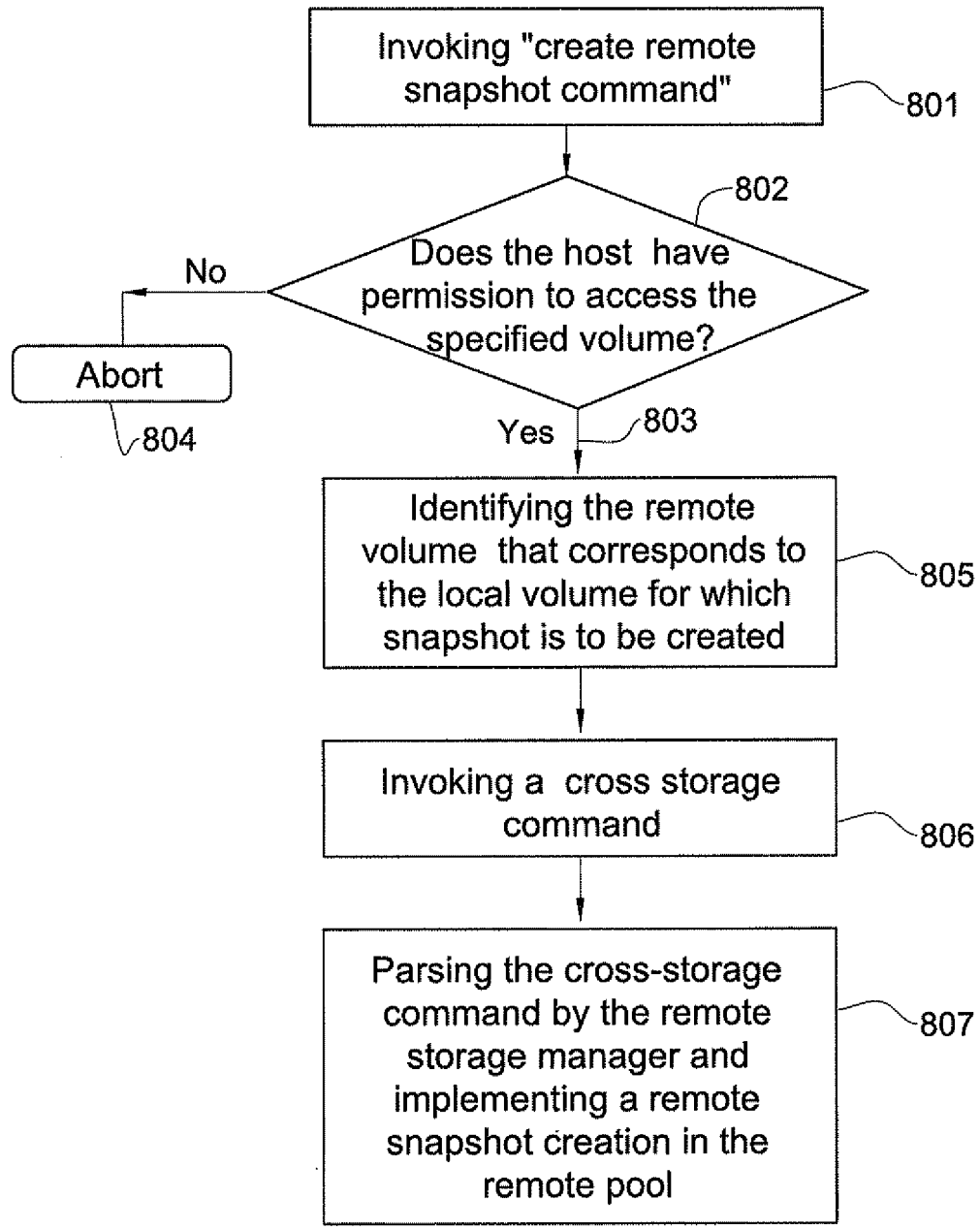
FIG. 8 illustrates a sequence of operations for implementing a remote create snapshot command, in accordance with certain embodiments of the invention.

Bearing this in mind attention is drawn to FIG. 8, illustrating a sequence of operations for implementing a remote create snapshot management command, in accordance with certain embodiments of the invention. The description of FIG. 8 will occasionally refer also to FIG. 7. Note that in accordance with certain embodiments, when invoking a "create remote snapshot management command", it is assumed that there is already available a remote volume that is associated with a local volume and designated to be a mirror thereof. The remote snapshot will be performed for the remote volume, however, due to the "mirror" relationship between the remote and local volumes, the remote snapshot is in fact a snapshot of the local volume. Thus, at the onset the host manager (e.g. remote management control module 300) invokes a "create remote snapshot command" 801 embedded in SCSI protocol. The purpose of this command is to generate a snapshot (at a remote pool) to a volume stored in a remote pool. In accordance with certain embodiments the host manager ascertains if the host has permission to access the specified volume 802 (by this specific example, this is achieved by simply accessing the pool volume which is associated to a pool storing volumes that the host is permitted to access), and if in the affirmative 803 the sequence continues, otherwise the operation is aborted 804. The command is transmitted through the local pool volume (e.g. 501) to local resource management module 409. Since the command is a remote operation, it is transmitted by the local resource management module local pool volume to management control module 402. The management control module identifies the remote volume (at the remote pool 505) that corresponds to the local volume (step 805)) (e.g. utilizing table 270 of FIG. 2C). Having identified the corresponding volume, a cross storage command is invoked 806 (e.g. CREATE REMOTE SNAPSHOT, REMOTE VOLUME NAME). The command is embedded in a SCSI command and is communicated through the ITL handle to remote pool volume 510 and is then parsed by the remote resource management module 405 and converted to actually create remote snapshot in remote pool 511 (stage 807 at module 407). Note that the actual snapshotted data of local volume $V_1$ will be sent (according to the data snapshot policy) for storing in the corresponding remote volume through a link associating the local and remote storages, all as known per se.

As may be recalled, the resulting remote snapshot 255 of the remote volume 251 is depicted by way of example in FIG. 2B. The actual data in the remote snapshot will be written only upon invoking the I\O remote operation of create remote snapshot, all as known per se.

Note that the invention is not bound by the specified specific sequence of operations as depicted in FIG. 8, and also not by the specific modules depicted in FIG. 7.

It should be noted that in accordance with certain embodiments, the notion of an extended storage pool is extended to primary extended storage pool and secondary extended storage pool. With reference (for clarity) to FIG. 2B, the notion of primary pool (e.g. 253) and secondary pool (e.g. 202) is similar to the notion of a primary volume (e.g. 254) and a secondary volume (e.g. 251). That is, in the context of remote operations a primary storage pool 253 is associated with a secondary storage pool 252 on the remote storage such that:
 1. A remote secondary volume 251 will reside in a remote pool 252 associated with the pool 253 of the primary volume 254
 2. A remote snapshot 255 of a volume 251 will reside in a remote pool 252 associated with the pool 253 of the local volume 254.

In accordance with certain embodiments, once the remote storage pool is attached to the primary storage, it is viewed as an extension of the primary storage, and from this point onwards the primary storage administrator has full control over it by the ITL access control mechanism. This mechanism minimizes the need for coordination between the primary storage manager and the secondary storage manager.

Thus, in accordance with certain embodiments, the following advantages are achieved:
 Minimizes the need to coordinate between local and remote storage administrators.
 Unifies cross storage communication definition (e.g. ITL based between local and remote pool volumes) to that of a storage host communication definition (e.g. ITL based between the local host and local storage)

In accordance with certain embodiments, when local and remote pools are associated, one can specify that when creating a volume in the primary volume, a mirror volume is automatically created in the remote pool, either sync or a async, based on the definition for the relationship between the pools. This may be implemented, for example, by automatically triggering a CREATE VOLUME PAIR command (see discussion below) in response to CREATE LOCAL VOLUME command which generates a command at the local storage (pool).

The following sections explain how a host (host manager) can create/delete remote snapshots and manage remote mirroring using a set of management operations in accordance with certain embodiments. To execute these operations the host manager needs the appropriate privileges to run these commands on the host, but these privileges do not need to propagate to the storage, i.e. the storage subsystem does not have to manage other privileges than that of access control to volumes based on ITLs. In accordance with certain embodiments, the utilization of pool volumes in the manner specified may achieve the specified privileges.

Note that the invention is not bound by the listed commands and/or their syntax and semantics.

Create Remote Snapshot

In accordance with certain embodiments, Create remote snapshot command is of the form Create_Remote_Snapshot Volume_Name. This command will create a snapshot of Volume_Name at the remote site. The command is imbedded in a SCSI command and directed to the primary volume for which the snapshot is to be taken. If the host has access to the volume, the command will not be rejected. The local storage system finds the corresponding name of the remote volume and issues a cross storage system internal command of the form Create_Snapshot Remote_Volume_Name. Remote storage system will not reject the command provided the remote volume resides in a pool attached to the primary storage. Remote storage subsystem will create a snapshot in the remote pool exactly the same as for a host that creates a snapshot on the primary storage system.

Delete Remote Snapshot

Delete remote snapshot command is of the form Delete_Remote_Snapshot Remote_Snapshot_Name, Primary_Volume_Name. This command will delete a remote snapshot Remote_Snapshot_Name of a primary volume Volume_Name. Primary storage will honor the command from the host if the latter has access to Volume_Name. The local storage system finds the corresponding name of the remote pool and issues a cross storage system internal command of the form Delete_Snapshot Snapshot_Name, Remote_Pool_Volume_Name. Remote storage system will not reject the command provided the remote pool attached is attached the primary storage.

Query Remote Volumes

Query remote volumes command is of the form Query_Remote_Volumes Primary_Pool_Name. This command lists all remote volumes and their corresponding remote snapshots in a remote pool corresponding to the primary pool. For regular remote volumes the command will also list their corresponding local volumes if the volumes are in mirroring relationship. Access control is as above.

The following Create Volume Pair command will facilitate remote mirroring operation, in accordance with certain embodiments.

Create Volume Pair

Create Volume Pair is of the form Create_Volume_Pair Primary_volume_name. This command will create a volume with a name which optionally is uniquely derived from the primary volume name on a remote storage pool corresponding to the storage pool in which the primary volume resides. Once volume is created and associated (e.g. in corresponding volume tables) the command will initiate mirroring based on known per se mirroring command parameters (with initial data synchronization, without data synchronization etc.), utilizing e.g. in accordance with the specified Information Storage publication. Note also that remote mirroring means either sync and async mirroring all as known per se.

Note that in accordance with certain embodiments, the Create pair operation will merely associate the respective volumes which were created independently, as described above with reference to certain embodiments of the invention.

Terminate Volume Pair

Terminate Create Volume Pair is of the form Terminate_Volume_Pair Primary_volume_name. This command will terminate a volume pair with the logic as above. Once executing the specified command, remote mirroring will be terminated for the specified local volume.

Delete/create Remote Volume

Delete/Create Remote Volume allows a system administrator to delete or create a volume from a remote pool provided the system administrator has access to the corresponding local pool. The command is of the form Delete/create_Remote_Volume Remote_Volume_name, Primary_Pool_Name. Remote_Volume_name is created or deleted in a remote pool associated with Primary_Pool_Name. Access control is as above. Note: volume deletion is honored only if it is not a part of a mirror pair.

In accordance with certain embodiments, whenever remote snapshot is specified in the command, it is identified by its name and the associated primary volume. Alternatively, a remote snapshot can be also identified by its name and remote pool name or by its name and the corresponding primary pool name.

In accordance with certain embodiments, all consistency group related commands both for snapshots and for remote mirroring, are based on mechanisms above by providing the necessary atomicity of operation on multiple volumes.

In embodiments of the presently disclosed subject matter, fewer, more and/or different stages than those shown in FIGS. 6 and 8 may be executed. In embodiments of the presently disclosed subject matter one or more stages illustrated in FIGS. 6 and 8 may be executed in a different order and/or one or more groups of stages may be executed simultaneously. FIGS. 2A, 3, 4, 5 and 7, illustrate schematically the system architecture in accordance with certain embodiments of the presently disclosed subject matter. Each module in FIGS. 2A, 3, 4, 5 and 7 can be made up of any combination of software, hardware and/or firmware that performs the functions as defined and explained herein. The modules in FIGS. 2A, 3, 4, 5 and 7 may be centralized in one location or dispersed over more than one location. In other embodiments of the presently disclosed subject matter, the system may comprise fewer, more, and/or different modules than those shown in FIGS. 2A, 3, 4, 5 and 7.

The subject matter of the present application can have features of different aspects and/or embodiments described above or their equivalents, in any combination thereof.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer program product that includes a storage storing computer code for executing the method of the presently disclosed subject matter.

While various embodiments have been shown and described, it will be understood that there is no intent to limit the presently disclosed subject matter by such disclosure, but rather, it is intended to cover all modifications and alternate constructions falling within the scope of the presently disclosed subject matter, as defined in the appended claims:

The invention claimed is:

1. A system for managing remote resources comprising a remote storage system and a local storage system linked to the remote storage system, wherein the local storage system is linked to hosts, wherein the system is configured to:
    create a local pool in the local storage system for accommodating local volumes permitted to be accessed by a certain host;
    generate a first handle associated with the local pool for granting access to the local pool by the certain host;
    create a remote pool in the remote storage system for accommodating remote volumes and associating the remote pool with the local pool;
    receive by the local storage system from the certain host, a remote management command utilizing the first handle, wherein the remote management command includes a request for managing of a resource in the remote pool associated with the local pool;
    transmit, by the local storage system to the remote storage system, a cross storage management command that corresponds to the remote management command, for execution at the remote pool; and
    parse, by the remote storage system, the cross storage management command and implement a resource management in the remote pool.

2. The system of claim 1, wherein the remote management command is for managing a remote volume in the remote pool, wherein the remote volume is associated with a local volume in the local pool.

3. The system of claim 1, wherein said remote management command being a create remote mirror command, wherein the cross storage management command is for creating in the remote pool that is associated with the local pool a remote volume designated to be a mirror of a local volume indicated in the remote management command; and wherein the system is further configured to: associate the local volume with the remote volume; and initiate a mirroring process.

4. The system of claim 1, wherein the remote management command being a create remote snapshot command, wherein the system is further configured, in response to the remote management command, to identify in the remote pool, a remote volume that corresponds to a local volume in the local pool; wherein the remote pool is associated with the local pool that corresponds to the first handle; and wherein the cross storage management command is for creating a snapshot of the remote volume in the remote pool.

5. The system of claim 1, wherein the remote management command complies with an I/O (Input/ Output) protocol, while not directly concerns I/O operations.

6. The system of claim 5, wherein said I/O protocol being a SCSI (Small Computer System Interface) protocol.

7. The system of claim 1, wherein the system is further configured to generate a second handle for enabling access to the remote pool by the local storage system, wherein the cross storage management command utilizes the second handle and complies with an I/O (Input/ Output) protocol, while not directly concerns I/O operations.

8. The system of claim 1, wherein the system is further configured to create a local pool volume associated with the local pool and wherein the first handle is indicative of the local pool volume, thereby enabling association of the first handle with the local pool.

9. The system of claim 1, wherein the remote management command is selected from a group of commands consisting of: creating a remote volume, creating a remote snapshot of a remote volume, deleting a remote volume, deleting a remote snapshot of a remote volume and pairing a local volume and a remote volume.

10. The system of claim 1 wherein the remote management command is embedded in a SCSI (Small Computer System Interface) command.

11. A method for managing remote resources in a remote storage system linked to a local storage system, wherein the local storage system is linked to hosts, the method comprising:
    creating a local pool in the local storage system for accommodating local volumes permitted to be accessed by a certain host;
    generating a first handle associated with the local pool for granting access to the local pool by the certain host;
    creating a remote pool in the remote storage system for accommodating remote volumes and associating the remote pool with the local pool;
    receiving by the local storage system from the certain host, a remote management command utilizing the first handle, wherein the remote management command includes a request for managing of a resource in the remote pool associated with the local pool;
    transmitting, by the local storage system to the remote storage system, a cross storage management command that corresponds to the remote management command, for execution at the remote pool; and
    parsing, by the remote storage system, the cross storage management command and implementing a resource management in the remote pool.

12. The method of claim 11, wherein the remote management command is for managing a remote volume in the remote pool, wherein the remote volume is associated with a local volume in the local pool.

13. The method of claim 11, wherein said remote management command being a create remote mirror command, wherein the cross storage management command is for creating in the remote pool that is associated with the local pool a remote volume designated to be a mirror of a local volume indicated in the remote management command; and wherein the method further comprising:
    associating the local volume with the remote volume; and initiating a mirroring process.

14. The method of claim 11, wherein the remote management command being a create remote snapshot command, wherein the method further comprising in response to the remote management command, identifying in the remote pool, a remote volume that corresponds to a local volume in the local pool; wherein the remote pool is associated with the local pool that corresponds to the first handle; and wherein the cross storage management command is for creating a snapshot of the remote volume in the remote pool.

15. The method of claim 11, wherein the remote management command complies with an I/O (Input/ Output) protocol, while not directly concerns I/O operations.

16. The method of claim 15, wherein said I/O protocol being a SCSI (Small Computer System Interface) protocol.

17. The method of claim 11 comprising generating a second handle for enabling access to the remote pool by the local storage system, wherein the cross storage management command utilizes the second handle and complies with an I/O (Input/ Output) protocol, while not directly concern I/O operations.

18. The method of claim 17, wherein said second handle is an ITL (Initiator Target Logical unit number) handle that includes an initiator port for attaching to the local storage system, a target port for attaching to the remote pool, and a LUN (Logical Unit Number) uniquely identifying the second handle.

19. The method of claim 11 comprising creating a local pool volume associated with the local pool and wherein the first handle in indicative of the local pool volume, thereby enabling association of the first handle with the local pool.

20. The method of claim 11, wherein the remote management command is selected from a group of commands consisting of: creating a remote volume, creating a remote snapshot of a remote volume, deleting a remote volume, deleting a remote snapshot of a remote volume and pairing a local volume and a remote volume.

21. The method of claim 11 wherein the remote management command is embedded in a SCSI (Small Computer System Interface) command.

22. The method of claim 11, wherein said first handle is an ITL (Initiator Target Logical unit number) handle that includes an initiator port for attaching to the host, a target port for attaching to the local pool, and a LUN (Logical Unit Number) uniquely identifying the first handle.

\* \* \* \* \*